Figure 1:
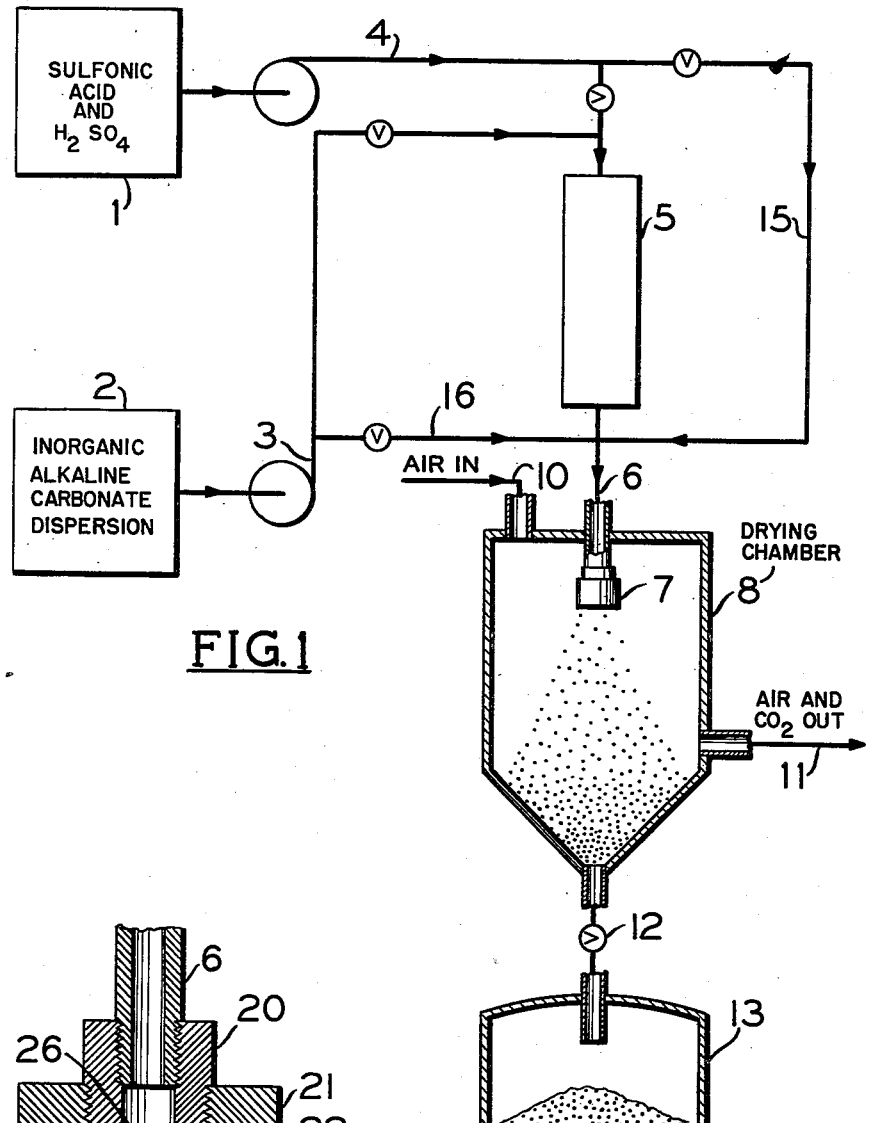

April 29, 1952

W. H. SHIFFLER 2,594,690

CONTINUOUS PROCESS FOR NEUTRALIZING AND
SPRAY DRYING AN ORGANIC SULFONIC ACID

Filed April 30, 1948

INVENTOR
WILLIAM H. SHIFFLER
BY:
ATTORNEYS

Patented Apr. 29, 1952

2,594,690

UNITED STATES PATENT OFFICE 2,594,690

CONTINUOUS PROCESS FOR NEUTRALIZING AND SPRAY DRYING AN ORGANIC SULFONIC ACID

William H. Shiffler, San Francisco, Calif., assignor to California Research Corporation, San Francisco, Calif., a corporation of Delaware Application April 30, 1948, Serial No. 24,225

9 Claims. (Cl. 252—161)

This invention relates to a new process of continuous neutralization of organic sulfonic acids. More particularly, it relates to a process of continuous neutralization of organic sulfonic acids with aqueous dispersions of inorganic alkaline carbonates. The term "inorganic alkaline carbonates" refers to two classes of carbonates: (1) water-soluble carbonates, e. g., those of alkali metals, exemplified by sodium and potassium carbonates, ammonium carbonate also being included in this class; and (2) carbonates of alkaline earth metals, e. g., magnesium and calcium. In other words, it designates carbonic acid salts of monovalent cations such as sodium, potassium and ammonium, and bivalent cations such as magnesium and calcium.

The various organic oxy-acids of sulfur, for instance, alkyl sulfonic, alkyl aryl sulfonic, alkyl sulfuric and the like, are characterized by their remarkable surface-active properties which make them valuable as ingredients for numerous wetting and/or detergent compositions, as well as for the preparation of textile assistants, levelling agents, and other types of surface-active materials. These organic oxy-acids of sulfur are commonly used for the preparation of the aforementioned compositions in the form of their inorganic alkaline salts, for example, sodium salts. In commercial practice, these alkaline salts have been prepared by the batch type neutralization of organic oxy-acids of sulfur with aqueous sodium hydroxide.

Attempted applications of inorganic alkaline carbonates to the neutralization of organic oxy-acids of sulfur are attended by a serious drawback which forces the operator to utilize sodium hydroxide as a neutralization agent, notwithstanding the substantially lower cost of many of the alkaline carbonates. This particular annoying drawback consists in the tendency of surface-active organic oxy-acids of sulfur and their derivatives to form a stable foam in aqueous solutions. In the course of neutralization with an alkaline carbonate, e. g., with sodium carbonate, carbon dioxide is released and a copious stable foam is formed which entraps and retains the carbon dioxide gas. The large volume of foam thus created interferes with the satisfactory recovery of the neutralized product and causes spillage and waste of materials.

It is an object of the present invention to eliminate the aforementioned difficulty of batch neutralization and product recovery with the attendant disadvantages thereof by effecting the neutralization of organic sulfonic acids in a continuous manner in accordance with the process to be described hereinafter.

In order to attain this object, the neutralization of organic sulfonic acids is effected by mixing a liquid feed stream of the acid with an aqueous dispersion of alkaline carbonate under pressure in a confined space, or zone. The reaction of the oxy-acid with the carbonate results in the formation of a gaseous phase of carbon dioxide, which is retained in the confined zone in a mixture with the liquid phase of neutralized product without releasing the autogenous pressure generated by the carbon dioxide gas, whereupon the entire polyphase mixture is immediately released or injected into a drying zone through a single spray nozzle, or several nozzles. In this drying zone the spray mixture encounters a stream of hot air or drying gas, the carbon dioxide is released and carried off by the hot air or gas, while neutralized organic oxy-acid of sulfur is dried and finally recovered in the form of discrete, finely-divided, solid particles.

It is to be noted that the polyphase mixture released into the drying zone may be either a diphase mixture of carbon dioxide gas and liquid, or a triphase mixture of gas, liquid and solid, in the case where the organic oxy-acid of sulfur is supplied to the confined neutralization zone in the form of a slurry containing a concentration of oxy-acid above its solubility limit. The carbon dioxide released during the neutralization in a confined zone increases the agitation of the reaction mixture, and thus contributes to the thoroughness of the neutralization, and aids the subsequent atomizing or spraying of the neutralized product. Additionally, passage of the reaction mixture through a spray nozzle causes the destruction of foam produced in the neutralization of organic oxy-acids of sulfur with the carbonate, promotes the release of the carbon dioxide gas into the drying zone and facilitates the dispersion of the neutralized liquid product in the form of fine particles or droplets which are subsequently dried to particulate solid form.

The process is applicable not only in the case of a single pure organic oxy-acid of sulfur, but may also be used on a mixture of such oxy-acids, or on a mixture which, in addition to an organic oxy-acid or oxy-acids of sulfur, contains sulfuric acid. Such a mixture, for instance, is obtained by sulfonating a mixture of alkyl benzenes containing from 12 to 18 carbon atoms in the alkyl chain.

Figure 2:
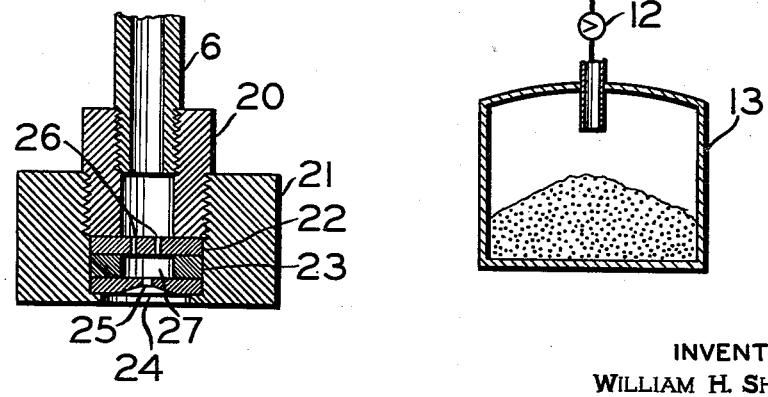

The operation of the process of the present invention can be more readily understood by reference to the attached drawing wherein Figure 1 is a flow diagram which shows the steps of neutralization and spray-drying, while Figure 2 illustrates the details of a typical spray nozzle. Although the process of the invention is operative with any of the various alkaline carbonates referred to hereinabove, for the sake of brevity, the description of the operation of the process in accordance with the flow diagram and the description of the experimental results will be given hereinafter with reference to an aqueous solution of sodium carbonate as the neutralizing medium.

In the flow diagram a liquid feed steam containing an organic oxy-acid of hexavalent sulfur is fed from vessel 1 through line 4 to meet a feed stream of an aqueous solution of sodium carbonate formed in vessel 2 and fed through line 3, immediately prior to being introduced into flow mixer 5, which may consist of a series of constricted orifices in the feed line and is designed to insure good mixing. The autogenous pressure of carbon dioxide formed as a consequence of the neutralization of organic oxy-acid of sulfur with sodium carbonate builds up because of the confined dimensions of flow mixer 5. This pressure and the velocity of the mixed stream contribute toward the formation of an intimate polyphase mixture of carbon dioxide gas and an aqueous liquid containing the freshly produced sodium salt of the oxy-acid, and toward forcing the aforementioned polyphase mixture from flow mixer 5 through short line connection 6 into nozzle 7, from which the mixture is sprayed into drying chamber 8. The flow of the liquid through the constricted orifices of the nozzle tends to destroy any stable foam previously formed, thereby releasing entrapped carbon dioxide gas. Chamber 8 may be operated as any conventional spray-drier by passing a current of hot air or drying gas which enters, as shown at 10, at a temperature which may range from not less than about 250° F. to as high as 1000° F. Upon contact with the hot air or drying gas, additional carbon dioxide is released by bursting of the liquid spray particles enclosing it, and escapes with the exhaust air or gas from drying chamber 8.

Concurrently with the release of carbon dioxide, the hot air or gas dries the wet slurry particles, and leaves drying chamber 8, shown at 11. The temperature of this exhaust air generally ranges from about 150° F. to about 350° F. The dried particles of the product drop to the bottom of chamber 8 and pass through drop valve 12 into receiver tank 13. Any of the fine dust which may fail to settle to the bottom of the drying chamber will be entrained by the exhaust air or gas and recovered therefrom in a suitable manner, for instance, with the aid of a dry cyclone separator.

In some instances, the use of a flow mixer may be dispensed with, and adequate mixing and neutralization of the organic oxy-acid of sulfur with sodium carbonate may be obtained by introducing the two streams through lines 15 and 16, respectively, into short pressure line 6 ahead of spray nozzle 7. In this case the neutralization occurs in the confined zone consisting of line 6 and nozzle 7 itself. The release of carbon dioxide due to the neutralization of oxy-acid of sulfur creates autogenous pressure just ahead of and in nozzle 7, and thus contributes to forcing the polyphase neutralization mixture of gas and liquid through the nozzle which destroys all foam. In other respects, the drying of the spray, and the concurrent release of carbon monoxide take place as described hereinbefore.

Necessary valves are provided on the several flow lines to cut out flow mixer 5 and to permit direct mixing in pressure line 6, as shown in the drawing. Sufficient turbulent flow may be created in pressure line 6 by high stream velocities to secure adequate mixing, and the resulting mixture is sprayed into drying chamber 8 through nozzle 7, which may be any suitable pressure-type spray nozzle, at a pressure from about 25 to about 100 p. s. i. An example of a pressure-type nozzle found to be satisfactory for the neutralization and spraying of the product in accordance with the present invention is shown in Figure 2.

In Figure 2, a threaded nozzle connection or nipple 20 is screwed onto feed line 6. Nut 21 housing disc 22 perforated by a plurality of holes, washer 23, and orifice plate 24 is screwed onto nipple 20. The mixed stream arrives through line 6, passes through holes 26 in disc 22 into inter-washer space 27, and is injected as a fine spray through orifice 25 into the drying chamber. The nozzle and mixing lines described hereinbefore may be manufactured of stainless steel or any other suitable material.

In accordance with the process, sodium carbonate for the neutralization is dissolved in hot water to increase solubility, desirably at a temperature of about 96° F., because this latter temperature corresponds to the maximum solubility of sodium carbonate in water. This temperature is not, however, critical to operativeness. By effecting the dissolution of sodium carbonate in hot water, the quantity of water required to dissolve the carbonate is substantially reduced, and a correspondingly lower consumption of energy during the drying of the neutralized products is thus assured. Furthermore, the heat of neutralization, which otherwise must be removed and constitutes a loss in the case of batch neutralization, provides a part of the heat required to dry the neutralized slurry, thus decreasing the operating costs. In addition, it has been found that higher neutralization temperatures are permissible without objectionable color deterioration of the final dried product. Conversely, superior light color products are obtainable by the present process at equivalent neutralization temperatures. The acid may be fed to the neutralization zone at any convenient temperature, such as atmospheric or higher.

The organic oxy-acid of sulfur and sodium carbonate are reacted to a pH which may range from about 5.0 to about 10.0 or higher. It may be noted that in the range above about pH 7.0 to 8.0, some sodium carbonate, largely in the form of bicarbonate, will be present in the final product.

The neutralization of the various organic oxy-acids of sulfur in accordance with the process of the present invention is applicable, for instance, to produce alkyl sulfates, alkyl sulfonates, alkyl aryl sulfonates, sulfonated esters of fatty acids, sulfonated amides of fatty acids, and the like. Organic oxy-acids of hexavalent sulfur are presently preferred. It may be noted at this point that inorganic builders, e. g., sodium sulfate, sodium silicate, various phosphates or their corresponding acids may be added to the oxy-acid feed prior to neutralization, as well as additives tending to enhance detergency and other surface-active properties, such as alkali metal salts of high molecular weight carboxylic acids, for instance, sodium salts of carboxymethyl cellulose or of oxidized cellulose, as well as defoaming agents and auxiliary detergents.

A series of test runs were made using a mixture of equivalent weights of sulfuric acid and alkyl benzene sulfonic acid with 12 to 18 carbon atoms in the alkyl chain. The runs were carried out without flow mixer, with neutralization taking place just ahead of and in the spray nozzle. Approximately 60 pounds pressure at the nozzle was used to produce a spray. Samples of the spray were caught on the plate of a spot test indicator and immediately tested for pH. This device represents a porcelain plate having a number of cavities for receiving the various pH indicators and the samples of the materials to be tested. In the tests of the spray product illustrated by Table I, the indicator which is known in commerce as the Universal pH indicator has been used, and the results showed that in some runs the neutralization reaction was only partly completed in the nozzle discharge product. The completion of neutralization and disengagement of carbon dioxide occurred within the drying chamber. However, where the original sodium carbonate feed was in excess of approximately 12% over the amount theoretically required for the neutralization of the acid, an acid-free nozzle product was obtained.

Table I

| Run No. | Feed Conditions | | | Product Analysis | | |
|---|---|---|---|---|---|---|
| | Lb./hr. $Na_2CO_3$ | Lb./hr. Water | Lb./hr. Acid | Nozzle Product | Per Cent Excess Carbonate | Per Cent Water |
| 1 | 16.3 | 48.7 | 26 | Basic | 18.0 | 68.6 |
| 2 | 16.3 | 48.7 | 31 | do | 13.4 | 64.7 |
| 3 | 16.3 | 48.7 | 35 | Acidic | 7.0 | 61.6 |
| 4 | 16.3 | 48.7 | 26 | Basic | 17.9 | 66.6 |
| 5 | 16.3 | 48.7 | 31 | Acidic | 8.9 | 59.8 |
| 6 | 16.3 | 48.7 | 26 | Basic | 12.4 | 65.8 |

It was pointed out hereinbefore that some carbonate may be present in the ultimate dry product, most of it being usually in the form of bicarbonate. In all events it is always possible to secure a final dry, particulate product which has a desired pH value, and to reduce to a suitable minimum the content of carbonate by thorough mixing ahead of the nozzle and appropriate adjustment of the pH of the neutralization reaction mixture.

The following data have been obtained for a spray-dried product from the neutralization of the previously mentioned mixture of sulfuric and alkyl benzene sulfonic acids with sodium carbonate in accordance with the invention:

| (Mesh) Screen Analysis | | | Product Analysis | | | | |
|---|---|---|---|---|---|---|---|
| 20–100 | 100–200 | 200+ | Per Cent Sulfonate | Per Cent Sulfate | Per Cent Carbonate | Water | pH |
| 14.6 | 31.9 | 55.5 | 29.0 | 60.6 | 10.2 | 0.95 | 10.4 |

It will be appreciated by those skilled in the art that some of the details of operating technique and process conditions described hereinabove with reference to the neutralization of organic oxy-acids of sulfur with aqueous sodium carbonate may be modified when using other types of alkaline carbonates, depending on the nature of the particular carbonate involved. For instance, while the water-soluble alkali metal carbonates will be fed to the mixing zone in the form of their aqueous solutions, the least soluble alkaline earth metal carbonates will be fed as aqueous suspensions or slurries. Furthermore, in using magnesium carbonate, a longer time of mixing may be necessary to secure adequate neutralization of the acid by the suspension or slurry of finely-divided magnesium carbonate. Similar modification of the process conditions may be adopted in the case of calcium carbonate. When this latter neutralizing agent is to be used to neutralize an organic oxy-acid of sulfur containing an admixture of sulfuric acid, such as the mixture of alkyl benzene sulfonic acid and sulfuric acid described in this specification, the excessive formation of calcium sulfate may be reduced by diluting the sulfonation reaction mixture with water and thus stratifying the sulfuric acid, and withdrawing the resulting layer of sulfuric acid as by decanting prior to contacting the sulfonic acid with the slurry of finely-divided calcium carbonate. In the case of ammonium carbonate, drying temperatures desirably will be lowered to minimize any tendency toward decomposition owing to the relatively lower stability of ammonium salts.

Important advantages will be secured by the application of the continuous neutralization and spray-drying process of the present invention, namely.

Foaming as a problem is substantially eliminated; expensive and bulky neutralization equipment such as tanks, circulating pumps, transfer lines, heat exchangers, etc., are no longer necessary; and considerable saving is secured by substituting in lieu of the formerly preferred sodium hydroxide the less costly inorganic alkaline carbonates, the use of which, in addition, permits a more accurate control of the pH of the product. Moreover, color deterioration is minimized by the short time interval during which the aqueous mixture is held at neutralization temperatures.

In conclusion, it is emphasized that the invention is by no means restricted to the particular alkyl benzene sulfonate-sulfate mixture of the illustrative test runs in the above description, and that the process includes within its scope all of the surface-active derivatives of organic oxy-acids of sulfur, whether used alone or combined with builders, fillers, additives, defoaming agents and other suitable agents and is limited only by the definitions in the appended claims.

I claim:

1. A continuous process for producing salts of a surface-active alkyl aryl sulfonic acid, which comprises neutralizing a liquid feed stream containing an alkyl aryl sulfonic acid in a mixture with sulfuric acid, by mixing said feed stream with a stream of an aqueous dispersion of an inorganic alkaline carbonate in a confined space, while retaining carbon dioxide gas produced by said neutralization in said confined space to form a polyphase mixture of said carbon dioxide gas and an aqueous liquid which contains the salt of said alkyl aryl sulfonic acid and the sulfate resulting from neutralization with said alkaline carbonate; atomizing said polyphase mixture by means of the autogenous pressure of carbon dioxide gas contained therein into a stream of hot air to release carbon dioxide gas therefrom; drying the atomized particles by maintaining them dispersed in said stream of hot air; and recovering discrete, solid, dried particles of said salt of alkyl aryl sulfonic acid and of said sulfate from said air dispersion.

2. A process as defined in claim 1, wherein said surface-active alkyl aryl sulfonic acid is an alkyl benzene sulfonic acid, said alkaline carbonate is sodium carbonate, said stream of hot air, when contacted with the atomized particles of the polyphase neutralization mixture, is at a temperature of not less than about 250° F., said salt of alkyl aryl sulfonic acid is a sodium alkyl aryl sulfonate and said sulfate is sodium sulfate.

3. A process as defined in claim 1, wherein said surface-active alkyl aryl sulfonic acid is an alkyl benzene sulfonic acid containing from 12 to 18 carbon atoms in the alkyl chain, said alkaline carbonate is sodium carbonate, said stream of hot air, when contacted with the atomized particles of the polyphase neutralization mixture, is at a temperature of not less than about 250° F., said salt of alkyl aryl sulfonic acid is a sodium alkyl benzene sulfonate and said sulfate is sodium sulfate.

4. A continuous process for producing salts of surface-active organic sulfonic acids, which comprises neutralizing a liquid feed stream containing a surface-active organic sulfonic acid in a mixture with sulfuric acid, said sulfonic acid normally tending to form a gas-retaining stable foam upon neutralization in aqueous solution, by mixing said feed stream with an aqueous dispersion of an inorganic alkaline carbonate in a confined space, while retaining the carbon dioxide gas produced by said neutralization in said confined space, to form a polyphase mixture of said carbon dioxide gas and an aqueous liquid which contains the sulfonic acid salt and the sulfate resulting from the neutralization with said alkaline carbonate; atomizing said polyphase mixture by means of the autogenous pressure of carbon dioxide gas contained therein into a stream of hot air to release carbon dioxide gas therefrom; drying the atomized particles by maintaining them dispersed in said stream of hot air; and recovering discrete, solid, dried particles of said sulfonic acid salt and said sulfate from said air dispersion.

5. A process as defined in claim 4, wherein said inorganic alkaline carbonate is an alkali metal salt of carbonic acid, said sulfonic acid salt is an alkali metal sulfonate, and said sulfate is an alkali metal sulfate.

6. A process as defined in claim 4, wherein said inorganic alkaline carbonate is sodium carbonate, said sulfonic acid salt is a sodium sulfonate, and said sulfate is sodium sulfate.

7. A continuous process for producing salts of surface-active organic sulfonic acids, which comprises neutralizing a liquid feed stream containing a surface-active organic sulfonic acid in a mixture with sulfuric acid, said sulfonic acid normally tending to form a gas-retaining stable foam upon neutralization in aqueous solution, by mixing said feed stream in a confined space with an aqueous dispersion of an inorganic alkaline carbonate in excess of the theoretical amount required to neutralize the acid, while retaining the carbon dioxide gas produced by said neutralization in said confined space, to form a polyphase mixture of said gas and the liquid product of the neutralization; atomizing said polyphase mixture by means of the autogenous pressure of carbon dioxide gas contained therein into a stream of hot air to release carbon dioxide gas therefrom; drying the atomized particles by maintaining them dispersed in said stream of hot air; and recovering discrete, solid, dried particles of said salt of sulfonic acid and of said sulfate from said air dispersion.

8. A continuous process for producing salts of an alkyl benzene sulfonic acid containing from 12 to 18 carbon atoms in the alkyl chain, which comprises neutralizing a liquid feed stream containing an alkyl benzene sulfonic acid having from 12 to 18 carbon atoms in the alkyl chain in a mixture with sulfuric acid by mixing in a confined space said feed stream of acid with an aqueous disperson of sodium carbonate in excess of approximately 12 per cent of the amount theoretically required to neutralize the acid, while retaining carbon dioxide gas produced by said neutralization in said confined space, to form a polyphase mixture of said carbon dioxide gas and the liquid product of the neutralization; atomizing said polyphase mixture by means of the autogenous pressure of carbon dioxide gas contained therein into a stream of hot air to release carbon dioxide gas therefrom; drying the atomized particles by maintaining them dispersed in said stream of hot air; and recovering discrete, solid, dried particles of said sodium alkyl benzene sulfonate and said sodium sulfate from said air dispersion.

9. A continuous process for producing salts of a surface-active alkyl aryl sulfonic acid, which comprises neutralizing a liquid feed stream containing an alkyl aryl sulfonic acid in a mixture with sulfuric acid with an aqueous dispersion of an inorganic alkaline carbonate in a confined zone, whereby an aqueous slurry of neutral sulfate and sulfonate salts is formed and carbon dioxide is evolved in said confined space to build up a superatmospheric autogenous pressure; utilizing this autogenous pressure to spray said slurry into a stream of hot air and to release carbon dioxide gas therefrom; drying the atomized particles by maintaining them dispersed in said stream of hot air; and recovering discrete, solid, dried particles of sulfonate and sulfate salts from said air dispersion.

WILLIAM H. SHIFFLER.

REFERENCES CITED

The following references are of record in the file of this patent:

UNITED STATES PATENTS

| Number | Name | Date |
|---|---|---|
| 1,737,792 | Gunther | Dec. 3, 1929 |
| 2,187,244 | Mills | Jan. 16, 1940 |
| 2,316,670 | Colgate | Apr. 13, 1942 |
| 2,325,320 | Holuba | July 27, 1943 |
| 2,422,128 | Percy | June 10, 1947 |
| 2,477,383 | Lewis | July 26, 1949 |